Feb. 8, 1949.   E. GRANAT   2,461,053
ALTERNATING CURRENT SYNCHRONOUS TRANSMISSION
Filed Jan. 20, 1948   2 Sheets-Sheet 1
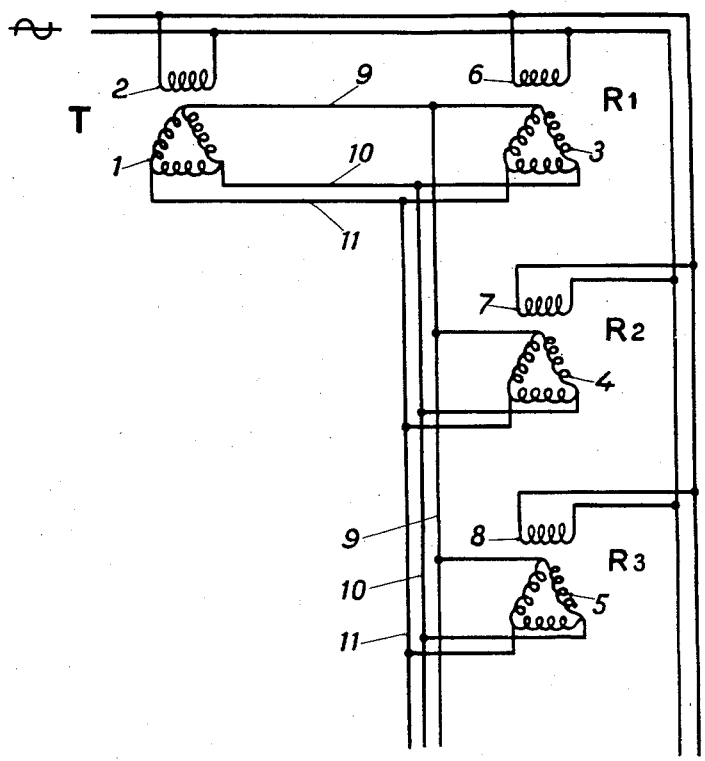
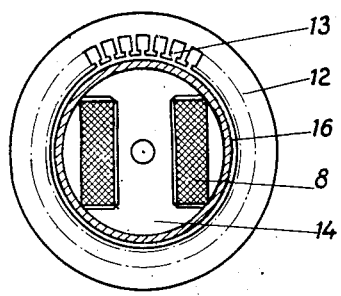
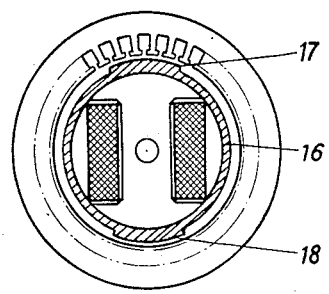
Inventor
Elie Granat,
by Feb. 8, 1949. E. GRANAT 2,461,053
ALTERNATING CURRENT SYNCHRONOUS TRANSMISSION
Filed Jan. 20, 1948 2 Sheets-Sheet 2
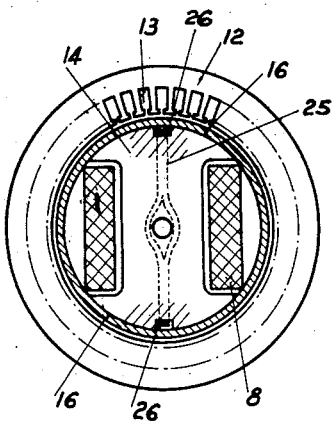
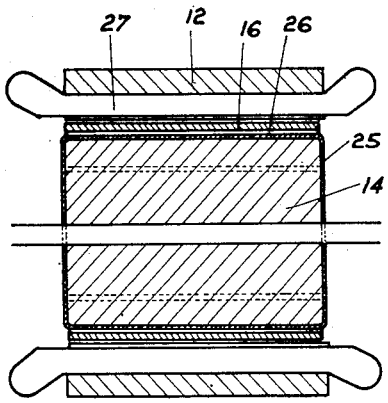
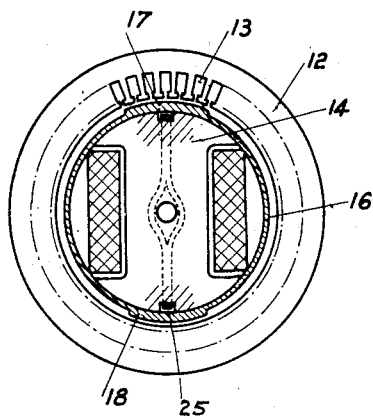
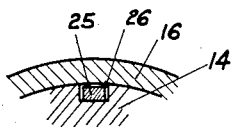

Patented Feb. 8, 1949

2,461,053

UNITED STATES PATENT OFFICE 2,461,053

ALTERNATING CURRENT SYNCHRONOUS TRANSMISSION

Elie Granat, Paris, France

Application January 20, 1948, Serial No. 3,188

7 Claims. (Cl. 318—24)

This invention is concerned with synchronous electric transmissions using alternating current, in which one of the machines operates as transmitter, while the others—fed in parallel—operate as subordinate receivers.

In the known installations of this kind, any displacement of the rotor of transmitter causes a synchronized displacement of the rotor of each of the receivers, and since the transmitter as well as the receivers are substantially of identical formation, the transmission in point is reversible. Thus, the displacement of the rotor of any of the machines included in the ensemble of the transmission will tend to cause the displacements of all other machines connected in parallel, and each machine will tend to behave either as transmitter or as receiver.

Therefore, when the transmitter feeds several receivers in parallel, every shifting occurring, for any reason, in one of the receivers, for example an abnormal resisting couple, will have for its effect to cause a reaction upon the rotors of the other receivers connected in parallel, so that the position of the latter will, at every instant, differ from that of the transmitter rotor.

The present invention has for its object to improve this kind of installations by providing the receivers with a device suitable for withdrawing them from the mutual reaction and, consequently, rendering the operation of each receiver practically independent from shifting of the other receivers of the same installation.

According to the invention, said device consists substantially of a magnetic metal hoop of appropriate dimensions and shape, arranged around, and carried by, the receiver rotor. This hoop acts as a magnetic screen, reducing to a very low value the reactions of an abnormally blocked or shifted rotor upon the rotor of the other machines connected in parallel. A receiver provided with such a device cannot any more behave as transmitter.

On the other hand, the device according to the invention considerably betters the very operation of receivers by enhancing the static and dynamic accuracy and the oscillation damping relative to the position of equilibrium, and it will therefore find its application even in the installations having only one receiver. Indeed, the hoop has for its effect to increase the motor torque owing to the induction currents occuring in the magnetic mass, the magnetic flux due to the induction currents coming to join the flux resulting from the direct excitation of the rotor. Finally, the hoop acts as oscillation damper, since every oscillation of the rotor of receivers relative to the position of the stator field brings about an induction in the magnetic mass that tends, by virtue of the law of Lenz, to oppose the oscillatory motions.

According to the invention, the effectiveness of said device may be increased by providing the inductor in the receivers with a coil in short-circuit with itself arranged around and carried by the inductor, the plane of this coil passing through the axis of rotation of the motor and further located in the axis of inducing magnetic field. Said coil will be constituted at least by one convolution in short-circuit with itself.

This coil device, associated with the magnetic hoop, acts in the same sense as the hoop and completes its action; on one hand, it raises the maximum value of the receiver motor torque and, on the other hand, aids to rapidly increase this torque in the outset owing to the induction effects that occur in the magnetic mass, wherefore the accuracy of operation is enhanced; it strengthens the damping effect already brought about by the hoop, every oscillation of the rotor relative to the position of the stator field causing in the magnetic mass an induction that tends, by virtue of the law of Lenz, to oppose the oscillatory motions. Finally, the coil combined with the said hoop neutralizes the mutual reaction among the receivers for the reasons hereinabove stated.

In order that the invention may be well understood and readily carried into effect, the same will now be described with reference to the accompanying drawings in which:

Fig. 1 is a diagrammatic layout showing the principle of the transmissions to which the invention is applicable;

Fig. 2 shows a form of device according to the invention applied to a receiver rotor;

Fig. 3 shows a further form of device according to the invention applied to the rotor of Fig. 2;

Figs. 4 and 5 are transversal and longitudinal sections, respectively, of a device similar to that of Fig. 2 completed by adjunction of a coil in short-circuit with itself;

Fig. 6 is a detail view relating to Figs. 4 and 5; and

Fig. 7 shows a modified form of device according to the invention, corresponding to Fig. 3.

In Figs. from 2 to 7 similar numerals of reference indicate like parts throughout the several views.

Referring first to Fig. 1, designated by T is the transmitter, while designated by $R_1$, $R_2$, $R_3$, etc., are the receivers connected in parallel. In this transmission, which is of the known type, the transmitter T includes a stator 1 with three-phase windings and a rotor 2 fed from a source of alternating current through two slip-rings not shown. Similarly, each receiver $R_1$, $R_2$, $R_3$ ... includes a stator with three-phase windings 3, 4, 5 ... and a rotor 6, 7, 8 ..., respectively, fed from the same source of alternating current as the transmitter T.

Every angular displacement of the rotor 2 with respect to the stator 1 has for its effect to cause the rotors 6, 7, 8 to move with respect to the stators 3, 4, 5 through an angle equal to that through which the rotor 2 is moved. If the rotor of one of the receivers, for example 8, happens to be shifted with respect to the position in which it ought to be theoretically, then the receiver $R_3$ will play the role of transmitter with respect to the ensemble of the other machines connected in parallel, with the results that a modification of voltages may occur in the conductors 9, 10 and 11, changing the distribution of currents in the three-phase windings of the various machines, particularly in those of the receivers $R_1$ and $R_2$, and that, therefore, the rotors 6 and 7 may be shifted with respect to the positions in which they ought to be theoretically.

As will be seen in Figs. 2 and 3, the receiver comprises a stator 12 with three-phase windings of which only the grooves or notches 13 are shown in the drawings, and a rotor 14. According to this mode of construction, the rotor is of the bipolar type and has an excitation winding 8.

According to the present invention, there is arranged throughout the length of the magnetic circuit a hoop 16 the role of which will be understandable from the following explanation: when the receiver rotor 14 is in a position different from that of the rotor 2 of transmitter T, the receiver tends to behave as transmitter and to modify the voltages imposed in the conductors 9, 10 and 11 by the transmitter T, this action being likely to be produced, in the usual arrangements, by increasing the magnetizing current flowing through the winding 8, which tends to modify by induction the current in the winding of the stator 5; the hoop 16 forms a magnetic screen around the rotor, notably limiting the phenomena of induction of the rotor ampere-turns on the stator winding, whereby the reaction of a blocked receiver upon another free receiver will be considerably reduced.

Said hoop may be constructed in different manners. In the mode of construction illustrated in Fig. 2, it is constituted by a circular collar operating with constant air gap.

In the mode of construction illustrated in Fig. 3, the hoop operated with varying air gap and, to this effect, comprises two outward thicker portions 17, 18 in the form of polar masses arranged along the axis of the poles so as to cause a rapid decreases of the magnetic flux in the rotor when this is shifted with respect to the position in which it should be theoretically. It is indeed possible, by giving said polar masses appropriate dimensions and shapes, to build up a determined law of variation of the magnetic flux, which circulates in the machine, in function of the rotor shiftings, and more particularly to obtain very rapid variations of the flux for the rotor shiftings of small value. Obviously, every decrease in the flux of the machine results in reducing the reaction of the rotor winding upon the stator winding and, consequently, increases the effectiveness of the screen constituted by the hoop 16.

The modes of construction illustrated in Figs. from 4 to 7 include, in combination with the magnetic hoop 16, at least one convolution of electric conductor in short-circuit with itself, as hereinabove stated.

In the arrangement illustrated in Figs. 4 and 5 there is a stator 12 with three-phase winding 27 the notches 13 of which are identical with those of Figs. 2 and 3. The rotor 14 is of the bipolar type and has an excitation winding 8. The magnetic hoop is designated by 16.

According to the invention, a coil 25 in short-circuit with itself is disposed round the rotor 14 and within the hoop 16, parallelly to, and in a plane passing through their axes. Said coil may be constituted either by a sole convolution of conducting material or by a number of convolutions. The rotor 14 has two appropriate grooves 26 (more clearly shown in Fig. 6) in which the coil 25 is located. As hereinabove stated, the coil 25 serves to increase the effectiveness of the hoop 16.

Illustrated in Fig. 7 is the application of the coil 25 to the mode of construction described in connection with Fig. 3.

It is to be noted that the invention would be applicable where the roles performed by the stator and rotor be inverted, that is to say where the stator be provided with the inductor and the rotor with the three-phase winding.

It will be understood that the invention is not intended to be restricted to the particular constructions and arrangement of parts, shown and described, as the same may be modified in various particulars without departing from the spirit and scope of the invention itself which is intended to be defined in the appended claims.

What I claim is:

1. In an alternating-current synchronous electric transmission, a metallic hoop mounted round the rotor of each of the receivers connected in parallel to form a magnetic screen between the stator and rotor windings of each of the said receivers.

2. In an alternating-current synchronous electric transmission, a metallic hoop of equable thickness for operation with constant air gap mounted round the rotor of each of the receivers connected in parallel to form a magnetic screen between the stator and rotor windings of each of the said receivers.

3. In an alternating-current synchronous electric transmission, a metallic hoop of unequable thickness for operation with variable air gap mounted round the rotor of each of the receivers connected in parallel to form a magnetic screen between the stator and rotor windings of each of the said receivers.

4. In an alternating-current synchronous electric transmission, a metallic hoop having at least one outward thicker portion for operation with variable air gap and mounted round the rotor of each of the receivers connected in parallel to form a magnetic screen between the stator and rotor windings of each of the said receivers.

5. In an alternating-current synchronous electric transmission, a metallic hoop mounted round the rotor of each of the receivers connected in parallel to form a magnetic screen between the stator and rotor windings of each of the said receivers, and an auxiliary conductor coil having at least one convolution in short-circuit with itself and mounted around said rotor and within said hoop, in a plane passing through the axis of said rotor, to enhance the effectiveness of said hoop.

6. In an alternating-current synchronous electric transmission, a metallic hoop mounted round the rotor of each of the receivers connected in parallel to form a magnetic screen between the stator and rotor windings of each of the said receivers, two diametrally opposed grooves managed lengthwise of said rotor on the periphery thereof and within said hoop, in a plane passing through the rotor axis, and an auxiliary conductor coil having at least one convolution in short-circuit with itself and mounted around said rotor and within said grooves to enhance the effectiveness of said hoop.

7. The magnetic screen arrangement described in the next preceding claim characterized by that the two grooves face the corresponding outward thicker portions of the hoop.

ELIE GRANAT.

REFERENCES CITED

The following references are of record in the file of this patent:

UNITED STATES PATENTS

| Number | Name | Date |
|---|---|---|
| 1,477,827 | Hildebrand et al. | Dec. 18, 1923 |
| 2,107,872 | Nisbet | Feb. 8, 1938 |